United States Patent

[11] 3,626,415

| [72] | Inventor | John A. Montgomery<br>Oxon Hill, Md. |
|---|---|---|
| [21] | Appl. No. | 32,684 |
| [22] | Filed | Apr. 28, 1970 |
| [45] | Patented | Dec. 7, 1971 |
| [73] | Assignee | The United States of America as represented by the Secretary of the Navy |

[54] RADAR CHAFF EJECTOR
3 Claims, 2 Drawing Figs.

[52] U.S. Cl. .................................................... 343/18 E,
89/1.5 R, 102/37.6
[51] Int. Cl. ........................................................ H01q 17/00
[50] Field of Search ........................................... 102/34.4,
35.6, 37.6; 343/18 E; 89/1 B, 1.5

[56] References Cited
UNITED STATES PATENTS

| 3,500,409 | 3/1970 | Cash | 343/18 E |
| 3,362,290 | 1/1968 | Carr et al. | 89/1 B |
| 2,830,539 | 4/1958 | Cecil, Jr. | 89/1 B |
| 3,049,080 | 8/1962 | Schermuly | 102/35.6 X |
| 3,064,575 | 11/1962 | Schermuly | 102/37.6 |

*Primary Examiner*—Samuel W. Engle
*Attorneys*—R. S. Sciascia, Arthur L. Branning and James G. Murray ABSTRACT: A radar chaff ejector having a truncated segment shaped case containing in the bottom a gas-generating pyrotechnic covered by a gas cap. A flexible membrane fits into the case, covering the walls and the gas cap, and is secured to the rim of the case. Radar chaff is packed into the case and an arcuate cover is fitted thereon. When the device functions, the pyrotechnic ignites to generate gas pressure under the gas cap which accelerates the gas cap outward against the membrane to pop off the cover and effect an initial acceleration of the chaff. As the cap moves outward the gas pressure escapes around its edges but is contained by the flexible membrane which is pushed further outward thereby. The membrane will continue to expand outward under the influence of the gas pressure until it has ballooned out from the rim of the case, by which time all the radar chaff will be expelled.

PATENTED DEC 7 1971 3,626,415

INVENTOR

JOHN A. MONTGOMERY

BY *Arthur V. Leaming*

ATTORNEY

RADAR CHAFF EJECTOR

The invention described herein may be manufactured and used by or for the Government of the United States of America for governmental purposes without payment of any royalties thereon or therefor.

BACKGROUND OF THE INVENTION

This invention relates to devices for dispensing articles from a moving vehicle and more particularly to a device for ejecting radar chaff from a high-speed moving vehicle.

Ever since the invention of radar, it has been known that small strips of metal foil dispensed in the atmosphere in a cloud are highly visible to radar detectors and tend to mask or obscure the presence of targets in or on the far side of the cloud. For this reason there has been much interest in the art to develop a radar chaff ejector for dispensing a cloud of radar chaff from a moving vehicle for the purpose of tracking, or for obscuring the activity of some other vehicle in the radar chaff cloud from detection by radar.

One common technique for ejecting a cloud of radar thirty-second is to position a body of chaff within a container and on top of a gas generating pyrotechnic. At the proper time the pyrotechnic is ignited and the gas generated thereby expels the radar chaff from the container. While this appears to provide a simple and technically feasible approach to the problem, it has not worked satisfactorily in the past. One of the most serious problems encountered in ejection of radar chaff from high-speed moving vehicles is the damage to the chaff as it is ejected into the air stream. The individual dipoles of the chaff are typically one thirty-second to one-eighth inch wide, 2 inches long, and one to two thousandth of an inch thick, depending on the radar frequency band, hence the individual dipoles are relatively fragile and are unable to withstand any appreciable stress. Ejection of these fragile strips of foil from a high-speed moving vehicle such as an aircraft results in violent churning and agitation of the radar chaff cloud as it decelerates from the speed of the moving vehicle to its low-falling speed. It has been observed that this violent agitation of the radar chaff cloud results in severe damage to the individual particles so that they are intermeshed and shredded to a much finer degree than is desired. This results in a change in the frequency response characteristics of the individual particles that severely impairs the efficacy of the cloud for its intended purpose. Another problem which has been encountered in the pyrotechnic ejection of radar chaff has been in the effect of the pyrotechnic on the radar chaff payload. When the pyrotechnic is detonated behind the radar chaff the great heat generated thereby tends to burn the delicate dipole particles. In addition the brisance of the detonating pyrotechnic tends to wad the radar chaff into a solid lump so that when it is ejected from the vehicle it falls to the ground in a solid lump. To eliminate these difficulties, it has been proposed to position the pyrotechnic in a central container which is effective to protect the radar chaff from the brisance of the exploding pyrotechnic and to tie the chaff together in a paper bundle which can be pulled out by the cover of the device after it has been blown off by the pyrotechnic. While this approach has solved some of the problems it has resulted in a smaller payload of chaff since a greater volume of the chaff housing must be occupied by the pyrotechnic container. Moreover, it is difficult to insure that the chaff bundle will be pulled out of the chaff housing by the pyrotechnic. In addition, when the chaff bundle is successfully ejected it is concentrated in a small volume and its distributor into a wide cloud by natural spreading and wind currents is relatively slow. Finally this approach has been found to be far more expensive than is acceptable.

Another approach taken in the prior art has been to position the foil within a barrel arrangement and place the pyrotechnic behind a piston in the barrel. When the pyrotechnic is ignited the piston is expelled outwardly, forcing the chaff to be ejected from the barrel. This approach appears to be conceptionally appealing, but it has not worked out well in practice. The piston must fit fairly snugly within the barrel or the hot gas particles will escape around it and burn the foil strips. When the piston fits tightly within the barrel it has been found that it often becomes wedged within the barrel because of dents or strain in the barrel bore during deployment or by strips of foil becoming jammed between the piston and the barrel walls. Moreover, it is common for the mass of foil to be smashed between the lid of the case and the piston so that the foil is tightly wadded and falls to the ground in a lump.

There has, thus, long been a need in the art for a low cost reliable device for positive expulsion of radar chaff from a high velocity vehicle with minimal damage to the chaff dipoles.

SUMMARY OF THE INVENTION

Accordingly, one object of the present invention is to provide a radar chaff ejector that protects the radar chaff dipoles from injury by contact with a high-velocity wind stream.

Another object of the present invention is to provide a radar chaff ejector actuated by a pyrotechnic gas generator which protects the radar chaff from being burned and crushed by the pyrotechnic.

Yet another object of this invention is to provide a radar chaff ejector having maximal payload for the size of the device.

A still further object of this invention is to provide a radar chaff ejector which provides positive ejection of the radar chaff and which is inexpensive, uncomplicated and highly reliable.

Briefly, these and other objects are attained by providing a sealed module case which holds the chaff and can be ejected as a unit from the moving vehicle. A flexible membrane lines the interior walls of the module case and is sealed to its rim. A gas generator placed between the bottom of the case and the membrane is timed to function after the module case has decelerated to a speed at which the chaff may be softly expelled. The pressure generated forces the membrane outward, completely everting it and positively expelling the chaff.

DESCRIPTION OF THE DRAWINGS

A more complete appreciation of the invention and its many attendant advantages will develop as the same becomes better understood by reference to the following detailed description when considered in connection with the accompanying drawings, wherein.

DESCRIPTION OF THE PREFERRED EMBODIMENT

Figure 1:
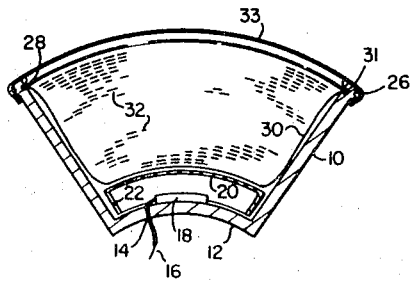
FIG. 1 is a side elevation partly in section of the radar chaff ejector according to the present invention.

Referring now to the drawings wherein like reference characters designate identical or corresponding parts throughout the several views, and more particularly, to FIG. 1 thereof wherein the radar chaff ejector of the present invention is shown having a truncated sector shaped module case 10. An arcuate base 12 which truncates the sector has formed therethrough an aperture 14 which contains the end of a delay fuse 16. A gas generator which may be a pyrotechnic composition 18 is located within module case 10 on base 12 and is connected to a means for activating the gas generator, such as fuse 16. An arcuate cap 20 having four depending legs 22 is positioned over pyrotechnic 18 and spaced slightly therefrom by legs 22 to provide a cushioning volume 24 between the underside of cap 20 and base 12.

Around the inside of the rim 26 of case 10 a groove 28 is cut.

The interior dimension of groove 28 is greater than its dimension at the inside surface of the module case wall. Such a groove can be cut by an outwardly flaring router or a ball-router or could be moulded in at time of fabrication.

A flexible membrane 30 is inserted into module case 10, lining its walls and covering cap 20. The upper edge of flexible membrane 30 is positioned over groove 28, and a small diameter elastic rod of a diameter approximately equal to that of the large dimension of groove 28 is forced into groove 28 which also forces the edge of membrane 30 into groove 28, holding it there and sealing it to rim of module case 10. Of course, other techniques of sealing the membrane to rim 26 are possible, such as adhesive or heat sealing to a plastic case.

A mass of radar chaff is inserted into module case 10 and is packed in firmly. Radar chaff 32 consists of narrow strips of very thin gauge metal foil approximately 1 to 3 inches long and one thirty-second to one-eighth inch in width. The entire module case 10 is filled with radar chaff 32 and a spring cover 33 is snapped onto module case 10 to cover and protect radar chaff 32 and prevent its premature escape from module case 10.

In operation, module case 10 fits into a complementary shaped notch in the exterior wall of the moving vehicle. At the proper time a pyrotechnic is ignited to expel the entire module case as a unit from the moving vehicle and at the same time ignites delay fuse 16 which burns for a short length of time, sufficient for the module case to decelerate in the air stream, for 1 to 2 seconds which is sufficient time for module case 10 to decelerate to a speed at which chaff 32 may be safely ejected from the module case. When the burning fuse 16 reaches the gas generating pyrotechnic 18 and ignites it, the gas generating pyrotechnic begins to burn and generate pressure under cap 20 causing an initial acceleration of cap 20 outward. The cap 20 causes an initial outward movement of the mass of radar chaff and pops spring lid 33 off the mass of radar chaff and pops spring lid 33 off the module case 10.

Figure 2:
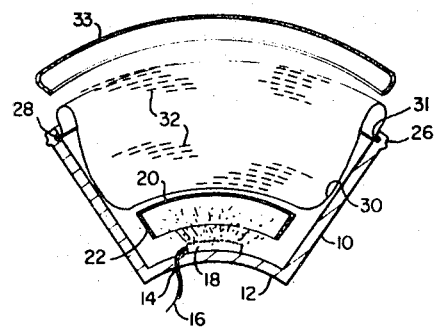
FIG. 2 is a side elevation of the radar chaff ejector shortly after ignition of the gas generating pyrotechnic.

Looking at FIG. 2, as the gas capture cap 20 moves outward it permits an escape of gas around its depending legs 22 which pressurizes the volume underneath flexible membrane 30. Depending legs 22, however, contain the hot particles of pyrotechnic 18 and thereby protect flexible membrane 30 from burning or other damage. The inertia of capture cap 22 contributes to softening of the impact of detonating pyrotechnic 18, and the volume contained between the inside surface of cap 20 and the outside surface of base 12 functions as a cushioning reservoir to absorb and further soften the initial impact of the exploding pyrotechnic 18 against gas capture cap 20, so that the action of the gas capture cap 20 against the mass of radar chaff is a smooth acceleration rather than an abrupt shock, and damage to the chaff which would otherwise be occasioned by the brisance of the pyrotechnic 18 is prevented.

Figure 3:
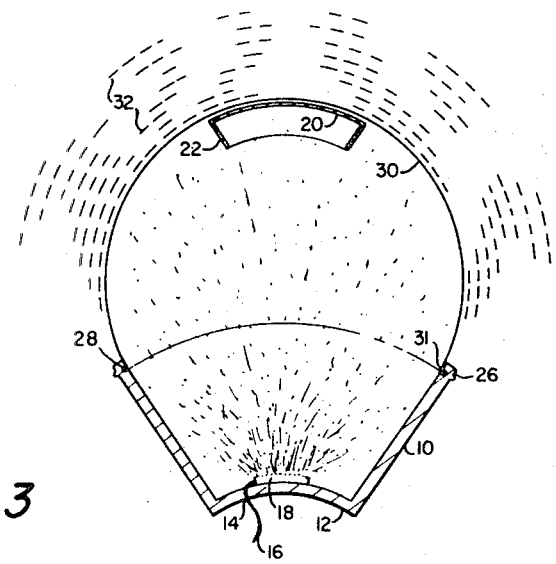
FIG. 3 is a side elevation of the radar chaff ejector after all the radar chaff has been fully ejected from the module case.

The expanding gases from gas generator 18 are contained within flexible membrane 30 resulting in an outward ballooning of membrane 30 as illustrated in FIG. 3, it can be seen therefore that complete expulsion or ejection of all radar chaff contained in module case 10 is assured by this arrangement. Obviously, numerous modifications and variations of the present invention are possible in the light of the above teachings. For example, the rigid segment-shaped case 10 and membrane 30 could be replaced with a flexible walled case inverted upon itself, somewhat like a collapsed beach ball. Inflation of the case by the gas generator would evert the pocket holding the chaff and positively eject it all. It is therefore to be understood that within the scope of the appending claims the invention may be practiced otherwise than as specifically described herein.

What is claimed and desired to be secured by Letters patent of the U.S. is:

1. An ejector for radar chaff and the like comprising:
    a concave case for holding radar chaff;
    a flexible evertible membrane lining the concave portion of said case and secured to the rim thereof, said chaff being placed within the concavity formed by said membrane
    a gas generator positioned between said membrane and said case; and
    means for activating said gas generator,
    the generated gas acting to push against said membrane to evert it, thereby expelling the chaff.

2. The radar chaff ejector defined in claim 1, wherein:
    said gas generator is a pyrotechnic composition;
    and further comprising a cap positioned between said gas generator and said membrane to protect said membrane from damage by said pyrotechnic.

3. The radar chaff ejector defined in claim 2, wherein:
    said case is an open ended rigid case having a closed base;
    means defined in said base forming therethrough an aperture;
    said activating means comprises a time fuse communicating with said aperture and with said gas generator.

* * * * *